United States Patent
Brown et al.

[15] 3,688,088
[45] Aug. 29, 1972

[54] CREDIT CARD VALIDATION SYSTEM USING AN OPAQUE CARD HAVING TRANSLUCENT CODED AREAS

[72] Inventors: William F. Brown, Wappingers Falls, N.Y.; Ronald J. Goetchius, Charlotte, N.C.

[73] Assignee: Texaco Inc., New York, N.Y.

[22] Filed: Sept. 18, 1970

[21] Appl. No.: 73,519

[52] U.S. Cl......235/61.12 R, 235/61.7 B, 340/149 A
[51] Int. Cl........G06k 21/04, G06k 7/10, H04q 3/74
[58] Field of Search..340/149 A; 235/61.12 R, 61.12 N, 235/61.11 E, 61.7 B; 250/219 D; 40/2.2; 283/6

[56] References Cited

UNITED STATES PATENTS

| | | |
|---|---|---|
| 3,536,894 | 10/1970 | Travioli.............235/61.7 B X |
| 3,399,473 | 9/1968 | Jaffe...........................40/2.2 |
| 3,263,999 | 8/1966 | McCoy...............235/61.12 R |
| 2,953,300 | 9/1960 | O'Brian..............235/61.12 R |
| 3,186,111 | 6/1965 | Lawlor................235/61.12 R |
| 3,275,806 | 9/1966 | Quinn .................235/61.12 R |
| 2,395,804 | 3/1946 | De Gruchy....................283/6 |
| 3,505,501 | 4/1970 | Ruddock.............235/61.12 R |

*Primary Examiner*—Maynard R. Wilbur
*Assistant Examiner*—Robert M. Kilgore
*Attorney*—Thomas H. Whaley and Carl G. Reis

[57] ABSTRACT

Methodology and apparatus for optically reading, or recognizing, numbers in coded form, on such articles as credit cards and the like. The article is made of an opaque substance with prepositioned, coded, translucent areas forming a pattern corresponding to a coded form of the card number.

3 Claims, 8 Drawing Figures

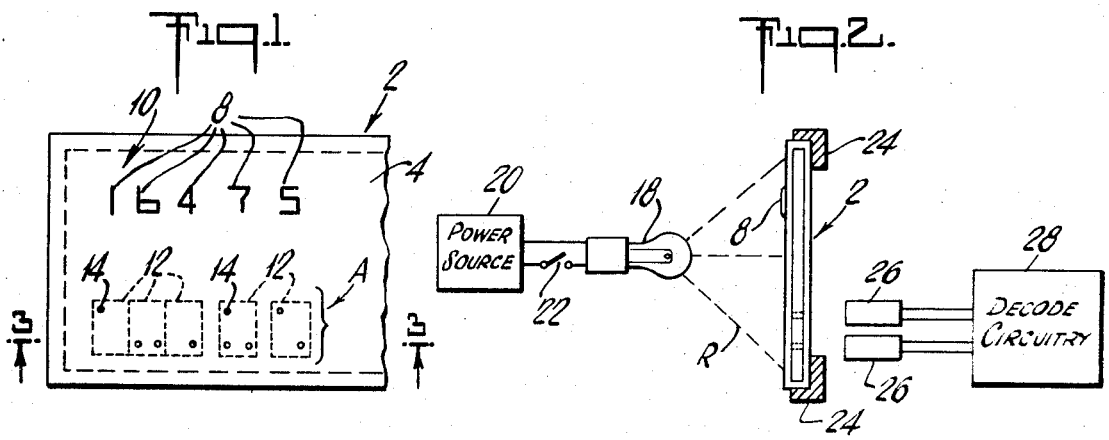
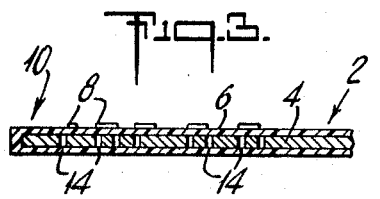
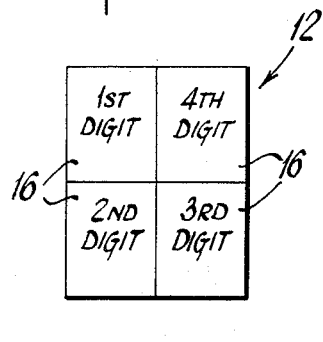
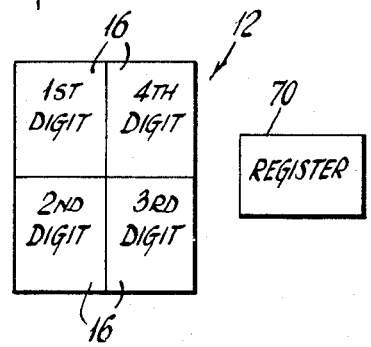

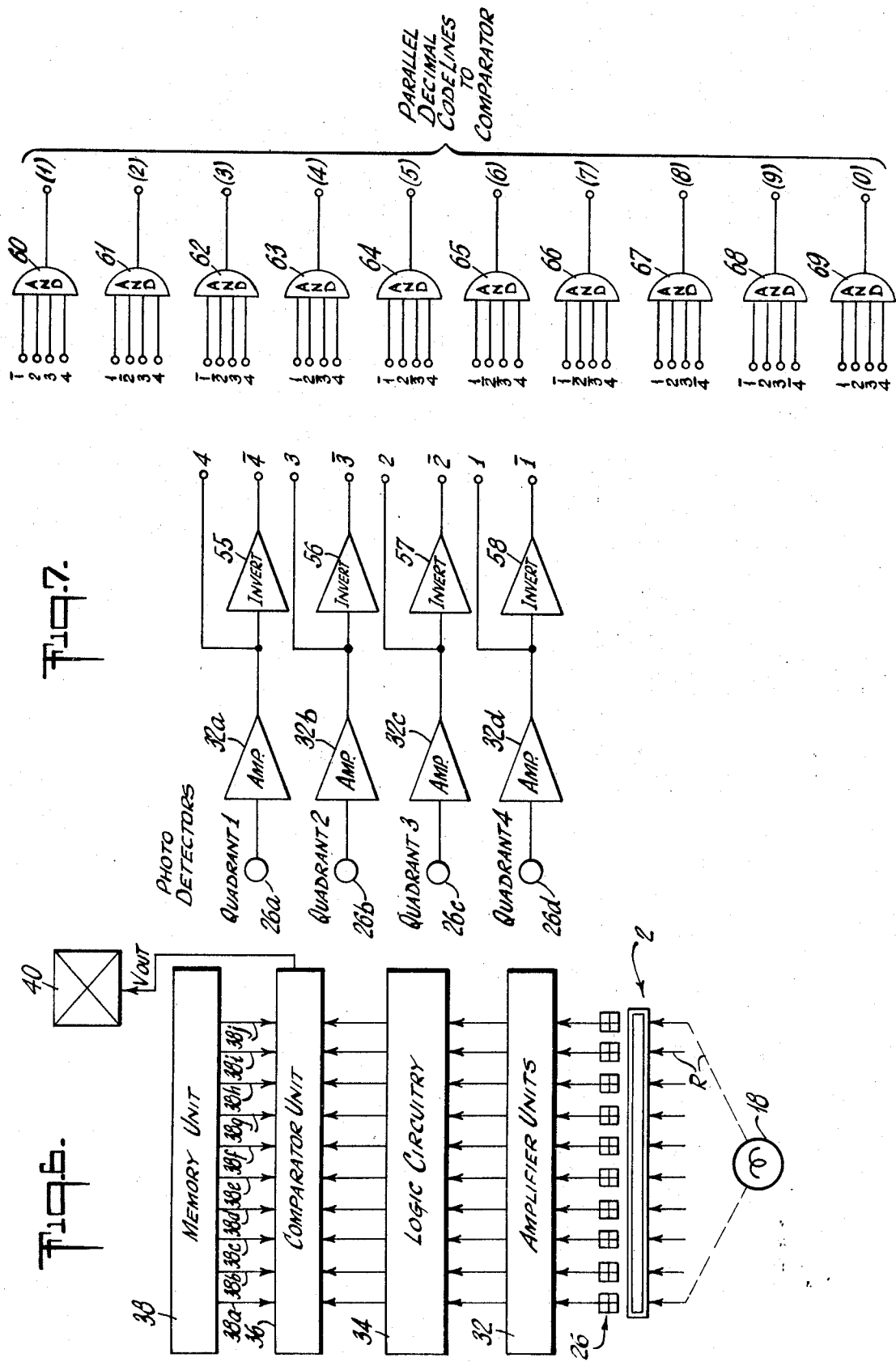

CREDIT CARD VALIDATION SYSTEM USING AN OPAQUE CARD HAVING TRANSLUCENT CODED AREAS

BACKGROUND OF THE INVENTION

This invention pertains, in general, to optically reading characters in coded form on such articles as credit cards and the like. In particular this invention pertains to an opaque credit card having thereon in coded form translucent areas.

Although the invention is hereinafter described, and illustrated in the accompanying drawing figures, as being useful in optically recognizing a coded identification number manufactured in the credit card, it is to be understood that the invention's use is not limited to the optical recognition of coded credit card numbers. Nor is it limited to the materials of which the credit card is manufactured or the method of manufacturing and using such credit card, although the invention has particular advantages when manufactured of the materials described and used in the way described.

One widely used form of credit card construction is the relatively thin plastic card which measures about 2-⅛ inches by 3 ⅜ inches. The card bears an identifying number (e.g., 10 decimal digits) which is embossed by means of a die into the card's surface. Usually, there is a substantial amount of printed matter such as indicia and holder identification on either or both faces of the card. More particularly, the embossing operation raises the digits upwardly on one face of the card and on the reverse face the embossed digits create a corresponding cavity or depression.

A method used for supportively maintaining the embossed character of the digits is to coat plastic faces over a metal center plate.

The credit card construction hereinbefore succinctly and generally described is not entirely satisfactory for some methods of character recognition or reading. For example, in the mechanical sensing system of reading the embossed digits, or embossed marks representing digits, on the card face, two causes, among others, of difficulty present themselves: (1) accumulations of dirt; and (2) distortion of the digits as occurs when the credit card is processed through an imprinter for making a receipt or invoice. The accumulation of dirt on and around the embossed digits, or characters, often interferes with the correct recognition of one or more digits and a false reading results. Distortion, or flattening and spreading of the embossed digits, or characters, caused by repeated processing in an imprinter similarly interferes with correct recognition and, again, false readings result. As described above, the various methods used to supportably maintain the embossed character of the digits or marks representing digits, only prolongs the useful life of the credit card by helping to maintain readability of imprints made with the credit card and does not avoid eventual loss of readability after long use.

SUMMARY OF THE INVENTION

The present invention is to correctly identify characters for, among other purposes, credit validation.

Another object of the present invention is to optically read identification characters in coded form on an article, such as a credit card.

Another object of the present invention is to employ transmitted light, or the absence or diminished intensity thereof, to optically read identification characters in coded form on an article such as a credit card.

An additional object of the present invention is to produce an article, such as a credit card, which, although continually used, maintains its identification characters in coded form in a state for sharp recognition thereof for instant recognition.

An independent object of the present invention is to obviate the necessity for mechanically moving an object across the face of on article such as a credit card in order to imprint the characters thereon onto a paper, such as an accounting statement.

An additional object of the present invention is to achieve the foregoing objectives with respect to articles, such as credit cards of the kind hereinbefore generally described, which have predetermined areas which are encoded with a different light transmitting material such as translucent areas on an opaque background, which are manufactured in said article, or credit card.

Thus, in accordance with an illustrative, not limiting, embodiment of the invention, there is provided a method of verifying the credit of a particular account wherein the account is evidenced by presentation of a credit card having in coded form an account number identifying the account, the coded form being optically recognizable as translucent areas against an opaque background, which comprises: directing light on a face of the credit card; transmitting through the translucent areas in the credit card, substantially that portion of the light received thereat, onto a plurality of photodetectors positioned adjacent the reverse of the credit card and at least one photodetector in vertical alignment with a vertical position where the translucent areas are positioned on the credit card; generating sets of signals responsive to each number in the coded form, each generated set of signals being representative of an individual number of the account number; encoding each generated set of signals; and comparing the encoded signals with other signals representing stored credit card account numbers in order to verify the credit of the account represented by the coded form on the credit card.

The embodiment includes a credit card having an opaque perforate center portion with coded information perforated in predetermined positions, the center portion being coated with a translucent covering to mask the perforate portions of the center portion.

Other objects as well as the various features and advantages of the invention appear hereinafter, where specific illustrative embodiments of the various features of the invention are set forth and described in detail with reference to the accompanying drawing figures.

BRIEF DESCRIPTION OF THE DRAWINGS

FIG. 1 is a frontal view of a typical credit card having coded translucent areas fixed therein.

FIG. 2 is a diagrammatic illustration including block diagrams of the overall system according to the invention.

FIG. 3 is a cross section view through the credit card shown in FIG. 1, taken along the section line 3—3 therein.

FIG. 4 is a representation of the corresponding decimal, binary and coded numerals from 0 to 9 inclusive, in accordance with the present invention.

FIG. 5 shows an area representing a coded number detailing the portions of the area where the coded numeral appears according to the invention.

FIG. 6 is a diagrammatic illustration including block diagram of the overall system according to the invention.

FIG. 7 is a block diagram showing, among other things, the logic circuitry employed for determining one digit of the credit card identification, or account, number.

FIG. 8 shows an alternative number coding arrangement.

DESCRIPTION OF THE PREFERRED EMBODIMENTS

A credit card 2 is shown especially in FIGS. 1 and 3. A perforate center member 4 of the credit card 2 is manufactured from an opaque material, for example, a beryllium copper or steel metal. A translucent outer covering 6 envelops the entire body of the center member 4 and is, for example, a plastic material which may have indicia printed thereon.

An identification number 8 can be embossed on the front face 10 of the credit card 2 for use where the operator accepting the credit card has only a mechanical card checker.

In a predetermined zone, for example, shown and identified as zone A in FIG. 1, a plurality of areas 12 (in dotted lines) are spaced horizontally along the face of the credit card 2. In each area 12, translucent windows 14 are positioned in preselected portions thereof in such a manner as to identify a numeral or mark according to a predetermined code.

In FIG. 4, one such code based on the binary system, is disclosed for adaptation to the subject optical credit card system. Each area 12, according to the disclosed code, is divided into four quadrants 16 (See FIG. 5) and in each quadrant a portion of the quadrant 16 is selected for inclusion of a single translucent window 14 if the quadrant is to represent a binary 1. The absence of a translucent window 14 in any selected quadrant 16 represents a binary 0.

The decimal numerals 0 to 9 are shown in FIG. 4 on the top line. Below it are identified the corresponding binary numerals 0000 to 1001 and below each binary numeral is the corresponding area with translucent windows 14 positioned in quadrants where a binary 1 should appear according to the designated code which will be given below in full detail.

The first binary digit, as shown in FIG. 5, appears in coded form as a translucent window 14 in the upper right hand quadrant of the area. The second, third and fourth binary digits appear in a clockwise manner, in the bottom right hand quadrant, bottom left hand quadrant, and top left hand quadrant, respectively. It should be remarked that although this particular code is described in detail herein, other codes using other number systems may be used. For example, a translucent window 14 can represent a "0" rather than a "1" so that the code identification is only reversed.

In accordance with FIGS. 4 and 5, the cipher of the herein disclosed code appears in Table I below:

TABLE I

| Decimal No. | Binary No. | Quadrant 1 | 2 | 3 | 4 |
|---|---|---|---|---|---|
| 0 | 0000 | | | | |
| 1 | 0001 | | | | x |
| 2 | 0010 | | | x | |
| 3 | 0011 | | | x | x |
| 4 | 0100 | | x | | |
| 5 | 0101 | | x | | x |
| 6 | 0110 | | x | x | |
| 7 | 0111 | | x | x | x |
| 8 | 1000 | x | | | |
| 9 | 1001 | x | | | x |

Referring to FIGS. 2 and 6 a light source 18 is connected to a power supply 20 with a switch 22 connecting the power supply 20 to the light source 18 so that the light source 18 is only energized when in use, the switch 22 can be any conventional single pole, single throw switch, for example, a micro-switch which is activated by a card being placed on the platen 24 of the optical readout machine. The light source 18 can, for example, be a conventional electroluminescent, fluorescent or filament-type bulb. Light, represented symbolically be the rays R, is directed through the translucent windows 14 but not through any other portion of the credit card 2.

Behind the platen 24, in registry with each quadrant 16, of the areas 12, a photodetector 26 is positioned to receive the light passing through the translucent window 14 with which it is associated. While many different kinds or types of photodetectors 26 may be employed, the type herein contemplated, for purposes of illustration, is the photoconductive device, e.g., a cadmium-sulfide cell which has a very high resistance in the absence of light and relatively low resistance in the presence of light. Thus, as is described in more detail above, light from light source 18 is transmitted through every translucent window 14 on the credit card 2 and onto the light sensitive surface of the corresponding photodetector 26, therebehind. As described above, in accordance with the code of Table I, a binary "1" corresponds to a translucent window 14 appearing in the associated quadrant 16. Decode circuitry 28 is connected directly to the photodetectors 26 so that the number can be optically read and logically identified and compared to a memory of outstanding account numbers.

Referring to FIG. 6, the logic circuitry 28 is shown in detail. The particular window array herein employed enables recognition of all of the ten decimal digits 1, 2, 3, 4, 5, 6, 7, 8, 9 and 0. As an illustrative example used herein, the cipher has been chosen, more or less arbitrarily, as a type of cipher that can be used. However, the instant invention does not depend on the use of the aforementioned particular cipher. The general principle of the invention obtains in respect of optically recognizing, or reading, translucent coded digits of any form in the credit card.

Behind each area 12 there is a photodetector unit of four photodetectors forming a photodetector unit array 26. In FIG. 6, the account number is 10 decimal digits long and is identified by 10 photodetector units 26. In other words, at each area 12 there is located a photodetector assembly, comprising four photodetectors, or more particularly, four photoconductors; one photoconductor being registered with one translucent window in the four window array at each area. As shown, each photodetector unit 26 is coupled through an individual amplifier unit generally designated in FIG. 6 by the reference number 32. From the amplifier units 32, signals generated by the photoconductors are fed to logic circuitry 34 which, as is more fully explained with reference to FIG. 7, processes the aforesaid signals and decodes the signals for the purpose of determining which one of the decimal digits 0 through 9 is being read.

From the logic circuitry 34 the decimal signals are routed to a comparator unit 36.

Also, there is provided a memory unit 38 which includes suitable storage means for storing 10 decimal digits, for each account number which is considered to be a delinquent account, signifying a poor credit risk. As shown in FIG. 6 the 10 signals representative of a particular account number are delivered via the paths 38a . . . 38j from memory unit 38 to comparator unit 36. If all the signals delivered from the logic circuitry 34 correspond with those delivered from the memory unit 38 then the comparator unit 36 delivers an output signal identified as $V_{out}$. The signal $V_{out}$ may be used to drive a visible or audible alarm 40.

In FIG. 7 there is illustrated in block diagram form, the logic circuitry 34 for a single area 12 having four quadrants. Four photodetectors 26a, 26b, 26c, and 26d are provided behind each of the quadrants 1, 2, 3 and 4. These photodetectors may be of the photoconductive type. The photoconductors are suitably coupled to the amplifiers 32a through 32d.

As indicated in FIG. 7 each amplifier 32a through 32d is coupled to the input of an inverter 55 through 58, respectively. As indicated the output from the amplifier 32a is designated as the output 4 while the output from the inverter 55 is designated as the output $\bar{4}$. Likewise, the output from the amplifier 32b is designated as the output 3 while the output from inverter 56 is designated as output $\bar{3}$. Likewise, output from amplifier 32c is designated as 2 while the output from inverter 57 is designated as output $\bar{2}$. Also, output from the amplifier 32d is designated as output 1 while the output from the inverter 58 is designated as the output $\bar{1}$.

If, for example, quadrant 2 is provided with a translucent window 14, the photodetector 26b will receive light and drive the amplifier 32b and inverter 56 such that the output $\bar{3}$ appears while the output 3 does not.

The outputs from the various amplifier and inverters 1 and $\bar{1}$, 2 and $\bar{2}$, etc., are used to drive the AND gates 60, 61, 62, 63, 64, 65, 66, 67, 68 and 69. If, for example, the four quadrants and their associated photodetectors 26a through 26d were detecting the decimal signal 6, then the output from the amplifiers and inverters would be 1, $\bar{2}$, 3, and 4. Hence, the only AND gate to be driven would be the AND gate 65 which would produce an output when all of its inputs were signals representing 1, $\bar{2}$, 3, and 4.

It is also within the scope of this invention and shown in FIG. 8 to include a fifth window or mark 70 placed alongside each area 12 so that each area would comprise a five window array. The fifth window would be used to indicate when each set of four quadrants 16 was in position to be read at a single four detector reading station. In such a way the card could be read one digit at a time as it passed through an appropriate sampler apparatus. Also, the digits could be decoded and compared serially one at a time, with greatly simplified circuitry.

While specific embodiments of the invention have been shown and described in detail to illustrate the application of the inventive principles involved, it is to be understood that the invention may be otherwise embodied without departing from the spirit and scope of the invention as hereinafter defined in the appended claims.

We claim:

1. A credit card comprising in combination
   a metallic plate,
   a translucent outer covering of plastic enveloping said plate,
   an identification number embossed on the front face of said card and supported by said metallic plate to reduce the amount of wear on said embossed numbers;
   a group of four binary coded perforations in said plate representing each decimal digit of said number; said groups of perforations are invisible to the naked eye, and each said group of perforations is located in line with a corresponding one of said decimal digits.

2. The combination according to claim 1, wherein each of said perforation groups comprises four quadrant locations with the perforations representing the binary number corresponding to the corresponding decimal digit.

3. The combination according to claim 2, further including
   an additional perforation located adjacent to each of said groups for assisting in the process of reading said individual code groups.

* * * * *